United States Patent
Holec (10) Patent No.: US 6,392,744 B1
(45) Date of Patent: May 21, 2002

(54) RANGE MEASUREMENT SYSTEM

(75) Inventor: Henry V. Holec, Mendota Heights, MN (US)

(73) Assignee: Analog Technologies, Corp., Burnsville, MN (US)

(*) Notice: Subject to any disclaimer, the term of this patent is extended or adjusted under 35 U.S.C. 154(b) by 0 days.

(21) Appl. No.: 09/734,082

(22) Filed: Dec. 11, 2000

(51) Int. Cl.[7] .......................... G01C 3/08; G01B 11/24; G02B 5/12
(52) U.S. Cl. .................. 356/4.03; 356/3.01; 356/4.01; 356/603; 359/515
(58) Field of Search .................. 356/603–608, 356/4.01, 3.01–3.14; 382/106; 359/515, 529, 530

(56) References Cited

U.S. PATENT DOCUMENTS

| | | | | |
|---|---|---|---|---|
| 4,802,759 A | * | 2/1989 | Matsumoto et al. | ........ 356/376 |
| 5,319,445 A | * | 6/1994 | Fitts | ........................... 356/376 |
| 6,295,124 B1 | * | 9/2001 | Yoshida | ..................... 356/3.04 |

* cited by examiner

Primary Examiner—Stephen C. Buczinski
(74) Attorney, Agent, or Firm—Gray, Plant, Mooty, Mooty & Bennett, P.A.

(57) ABSTRACT

A system and method for accurate measurement of distance and location of an object. The system comprises low-cost optical signal generators, aligned in a known configuration, to project a two-dimensional geometric figure on the object to be measured, or on a target attached to the object. The system captures an image of the projected figure, determines the exact geometry (e.g., area or circumference) of the figure, and calculates the exact distance to the object based on comparison of that geometry to the known configuration of the laser line generators. The invention simultaneously determines relative X and Y position of the object, thereby giving accurate X, Y, and Z coordinates.

26 Claims, 5 Drawing Sheets

RANGE MEASUREMENT SYSTEM

TECHNICAL FIELD

This invention concerns systems and methods for measuring the position and distance of a remote object.

BACKGROUND

Several methods have been employed to make non-contact measurement of distance or relative displacement of an object from a transducer. One class of such methods relies on optical principles. In measuring distance optically, parallax, wave interference, or time of flight are often employed. Parallax-based optical measurement can be further subdivided into multi-view (e.g., stereography) or structured light source (e.g., laser triangulation) systems. Most system designs seek to optimize one or more operational characteristics versus cost. Transducer size, range, operating distance, repeatability, accuracy, resolution, sample frequency, operating temperature range, sensitivity to environment, and shadowing effects are typical characteristics. There is a need for a low cost, low-to medium-range distance measurement system that exhibits exceptional repeatability, accuracy, speed, and low sensitivity to temperature and ambient light.

DISCLOSURE OF INVENTION

In general terms, one aspect of the invention is a system for measuring distance to a target along a Z axis within a measurement range. The system comprises at least one (preferably three) optical signal generator(s) that are aimed to project onto the target a signal in the form of a two dimensional geometric figure (as opposed to a line, pairs of non-intersecting lines, or a single point). The signal generator(s) are typically but not necessarily aimed directly at the target, i.e., along the Z-axis. Regardless of the direction of aiming, there could be an intermediate optical element, such as a mirror or lens, along the path; however, such elements are not required and in some embodiments they would not be preferred because they complicate the operation of the system (although the techniques to account for the use of such optical elements are well within the skill of the art). An image device is aimed (typically but not necessarily directly at the target) to capture a reflected image of the two dimensional geometric figure. Again, there could be an intermediate optical element, such as a mirror or lens, along the path. An image analyzer is connected to the image device. The image analyzer computes distance to the target from a geometric parameter of the reflected image. Typical geometric parameters are size, shape, area, orientation, length of perimeter (circumference), and other equivalent parameters.

A similar but alternative aspect of the invention is a system for measuring location of a target in three dimensions within a measurement range. This system is like the one just described, but the image analyzer also locates a point on the target relative to a field of view of the image device. Generally, but not necessarily, the point on the target is the geometric center of a known contrasting feature of the target. The system then uses the distance to the target and the point it has located, along with a predetermined magnification curve for the image device, to compute the location of the target in X and Y directions.

Another alternative aspect of the invention is a method for measuring distance to a target along a Z axis within a measurement range. The method does not require use of the equipment specifically described in the system aspects set forth above. The method comprises: projecting onto the target a two dimensional geometric figure; capturing a reflected image of the geometric figure; and computing distance to the target from a geometric parameter of the reflected image.

Yet another alternative aspect of the invention is a method for measuring location of a target in three dimensions within a measurement range. The method does not require use of the equipment specifically described in the system aspects set forth above. The method comprises: projecting onto the target a two dimensional geometric figure; capturing a reflected image of the geometric figure; computing, from a geometric parameter of the reflected image, the distance to the target along a Z axis; locating a point on the target relative to a field of view; and using the distance it has computed, the point it has located, and a predetermined magnification curve for the image device, to compute the location of the target in X and Y directions.

In any of the aspects of the invention described above, it is preferred but not required for the center of projection of the two dimensional geometric figure to lie along the Z axis. The two dimensional geometric figure may be a whole or partial polygon (the most preferred being a triangle), circle, or other figure having symmetric portions. The two-dimensional geometric figure need not be a closed figure so long as enough of the overall figure is visible to construct and analyze the image.

Typically, the target is retroreflective and/or mounted to an object within the measurement range, but neither of these is required.

Suitable image devices include electronic cameras of any design. Suitable signal generators are laser line generators and optical line projectors.

One specifically preferred technique is for the image analyzer to use a calibrated magnification of the system and the geometric parameter to determine the distance to the target. Another is for the image analyzer to use a calibrated lookup table to determine the distance to the target. Yet another is for the image analyzer to use a mathematical equation to determine the distance to the target.

Finally, another aspect of the invention is a target for determining location within a measurement range. This is the preferred, but not required, target for use in the aspects of the invention described above. The target comprises a base which has a flat retroreflective surface region. Within, and flush with, the flat retroreflective surface lies a flat contrasting inset region. A transparent protective cover (e.g., polycarbonate) lies over the retroreflective and contrasting regions. The preferred but not required shape of the target is circular. Another preferred but not required feature is some means of attachment to another object. Any means of attachment is suitable, and all such means are equivalents of each other for purposes of this invention.

BRIEF DESCRIPTION OF THE FIGURES

The figures illustrate an only example of the invention and therefore do not indicate limitations on the scope of the invention.

DETAILED DESCRIPTION

Figure 1:
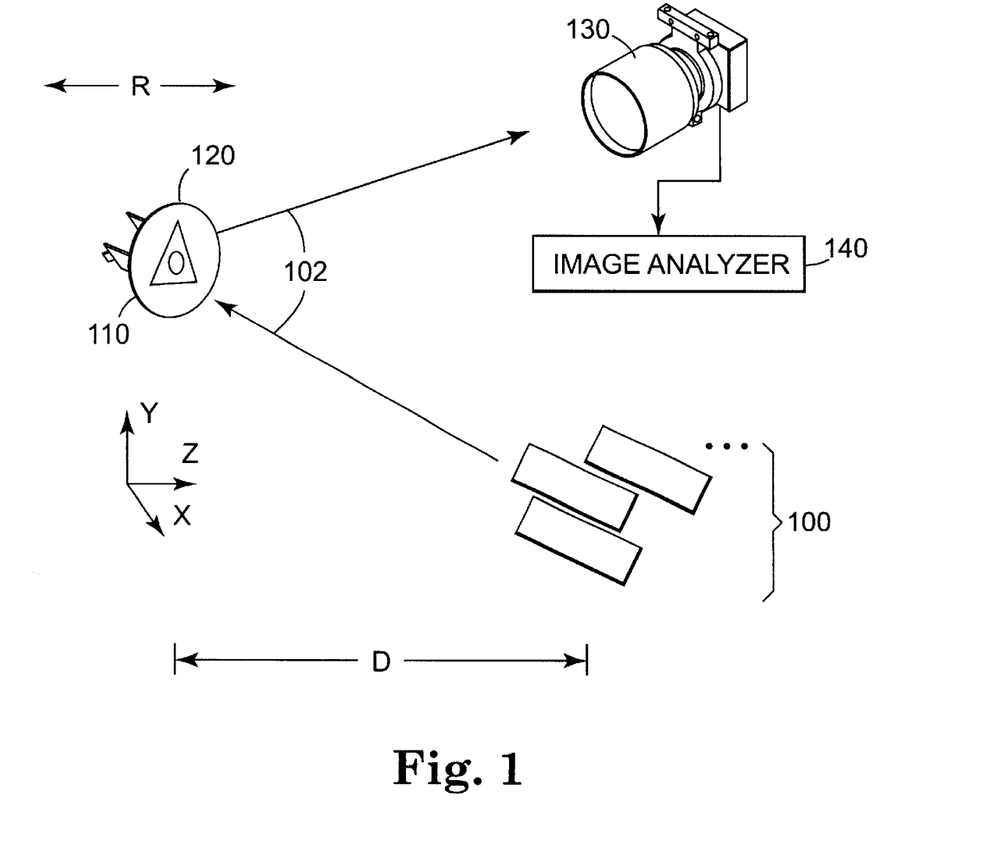
FIG. 1 is a schematic diagram illustrating the invention and related geometry.

FIG. 1 is a schematic diagram illustrating the invention and related geometry. A plurality of optical signal generators 100 are aimed to project a two-dimensional geometric FIG. 110 on a target 120. The generators are also aimed so that the two dimensional geometric figure is centered in the field of view of an image device 130 when target 120 is within a desired measurement range R. In the figure, the optical signal generators 100 and the image device 130 are shown to be not on a common axis, but this is only for convenience in the Figure. An image analyzer 140, connected to image device 130, is configured to compute the distance D to target 120.

Target 120, image device 130, and optical signal generator 100 may be stationary, in which case D is a static distance measurement; any (or all) may be moving relative to each other, in which case D is an instantaneous measurement. Multiple instantaneous measurements may be used to determine and/or control relative separation between the two, all in accordance with known principles.

Figure 2:
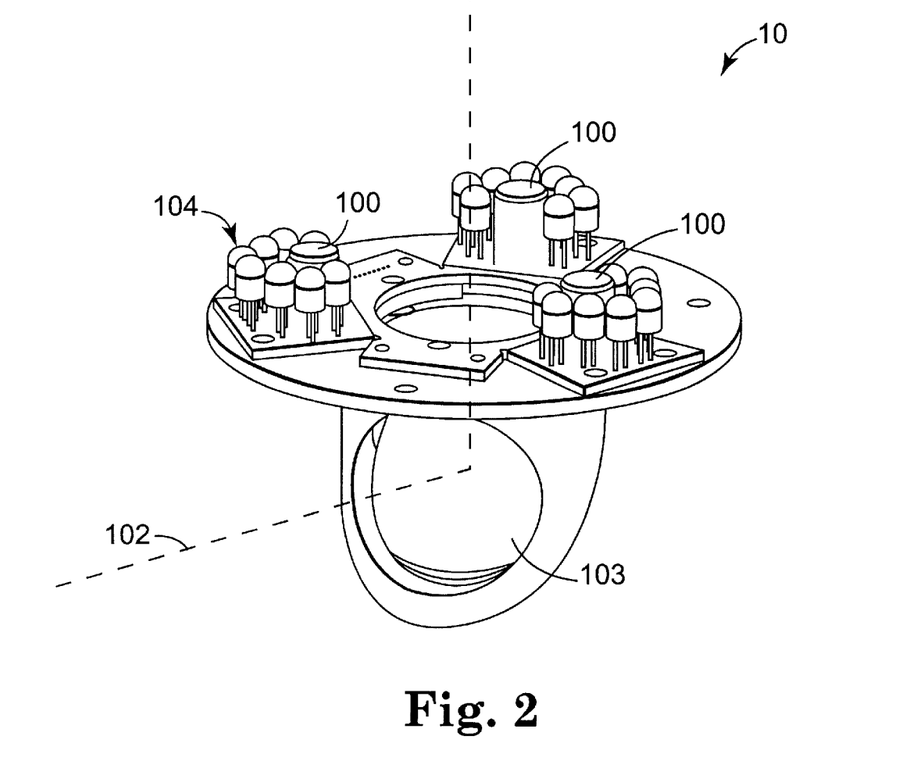
FIGS. 2 and 3 are respective side and top views of a preferred embodiment of the invention.
Figure 3:
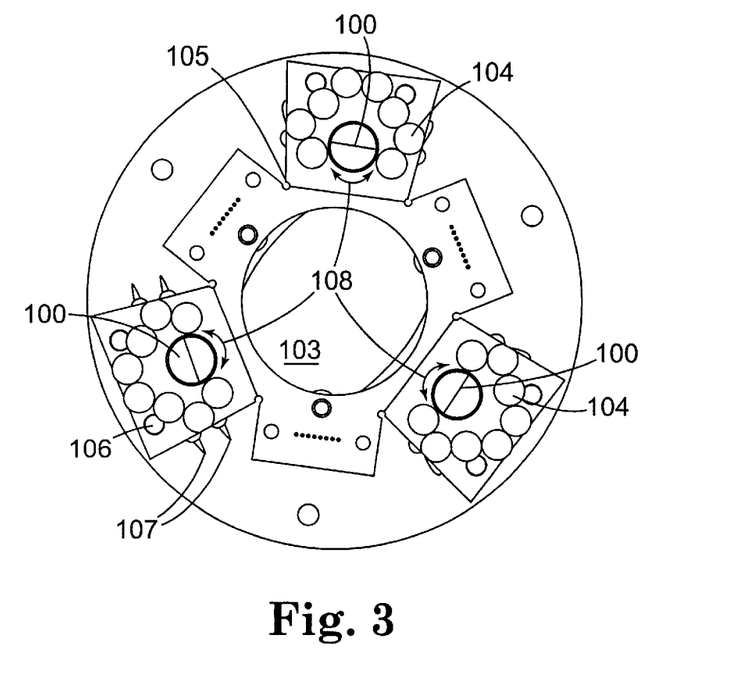

In the preferred embodiment, as shown in FIGS. 2 and 3, a measurement head 10 comprises three lasers 100 that each emit light in the shape of a line perpendicular to the direction of projection of the light. There are several conventional techniques for laser line projection, including cylindrical lenses (preferred), sweeping lasers, holographic lenses (not preferred as they produce poor images), masks, and the like.

The lasers are aligned and inclined toward the center of target 120. They are placed at 120-degree intervals surrounding an optical path 102 that extends to a CCD camera (not shown for clarity) serving as image device 130. Collectively, the three lasers create a narrow "beam" around optical path 102.

Figure 4:
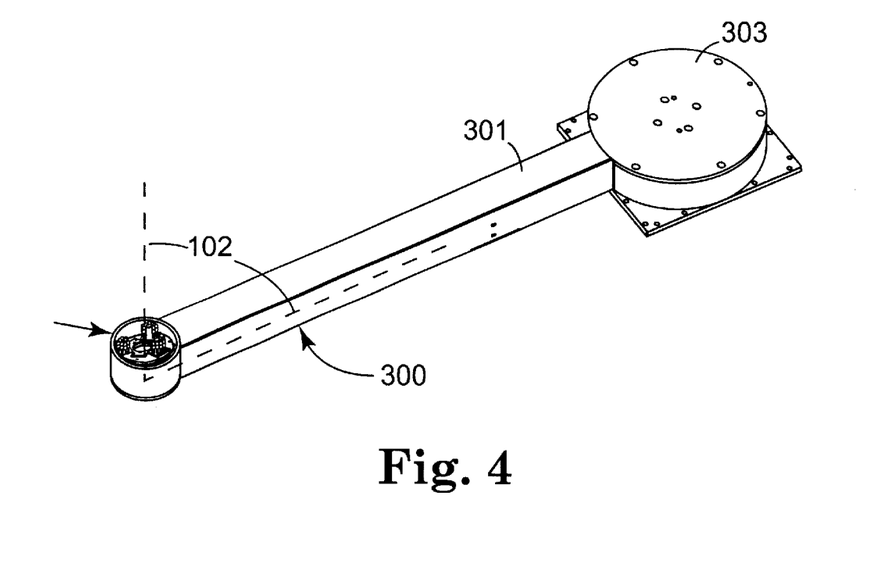
FIG. 4 is a perspective view of the embodiment of FIGS. 2 and 3 within an optional extension arm.

Optional mirror 103 permits measurement head 10 to be located in a preferred arm 300, as illustrated in FIG. 4, so that distances may be measured from below objects located above arm 300. The camera may be located within extension arm 301, remote from measurement head 10, which lengthens the optical path but thereby enables the use of low cost optical components despite a relatively short working distance between measurement head 10 and target 120. Extension arm 301 may move laterally and/or may rotate about its central axis by any convenient means 303. These options accommodate relatively large objects and/or multiple distance measurements.

Figure 6:
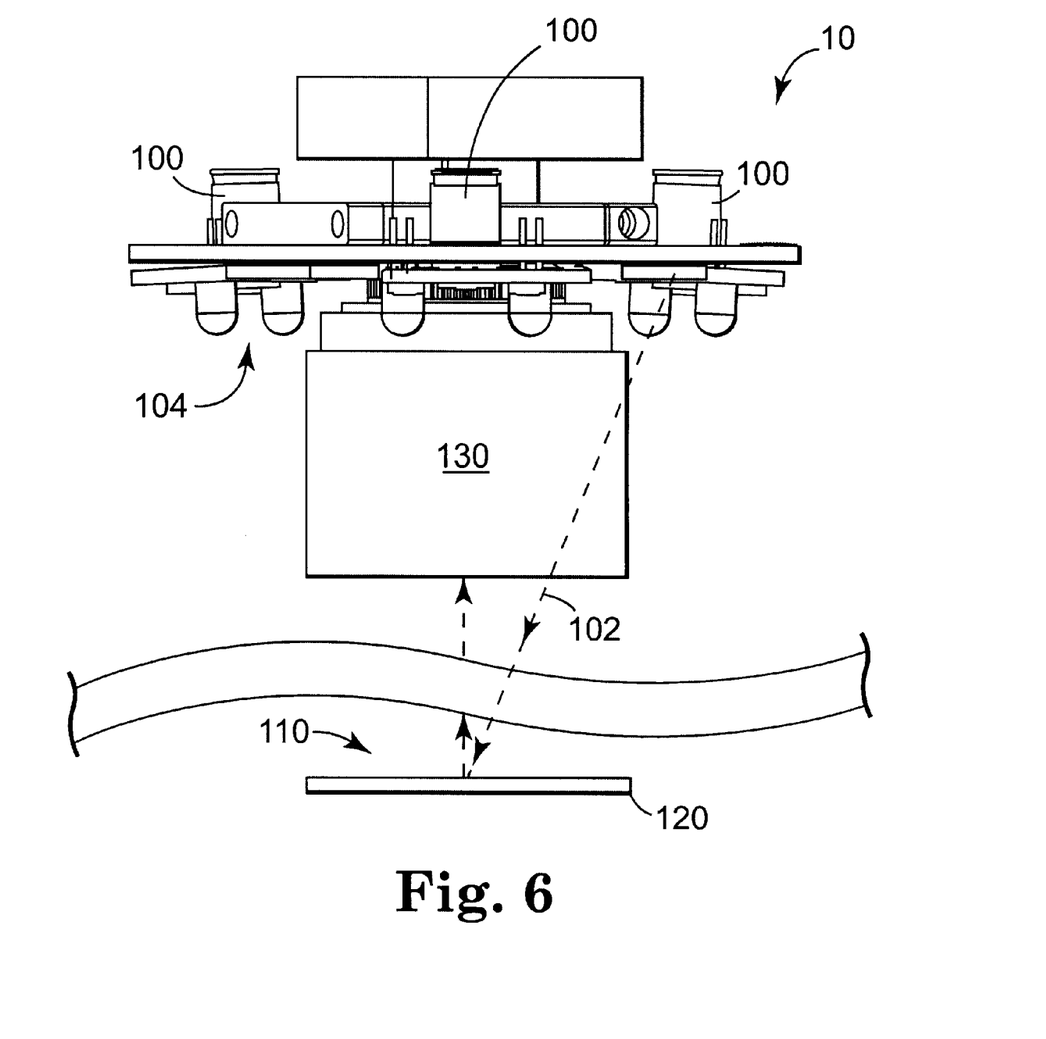
FIG. 6 is a side view of an alternative embodiment of the invention.

An alternative in which the camera is mounted at the center of measurement head 10 is illustrated in FIG. 6.

Any mechanism for accomplishing the needed alignment and inclination is suitable. In the preferred embodiment shown in FIGS. 2 and 3, three line-generating lasers 100 are mounted to a printed circuit board having a center hole cut out for the camera optics path. The printed circuit board is mounted to a stiff metal ring. The mirror is seated on a cut cylinder mounted behind the ring. The lasers 100 are symmetrically placed at 120 degree spacing on the board. The printed circuit board has a relief slot allowing that the lasers to be tilted slightly using a pair of adjustment screws 106 at the corners 105 of each leaf. The adjustment screws pull against spring tension provided by a clip 107 at the back of the board. This clip also seats the laser in its mounting hole, keeping it square to the board.

Thus, at a given distance from camera 130 near the middle of the measurement range R, all three lines intersect at a single crossover point. If target 120 is not at that crossover point, the three lines form a triangle as two-dimensional geometric figure 110. Image analyzer 140 uses the image of the triangle captured by image device 130 to obtain the circumference of the projected triangle. The orientation of the triangle indicates whether target 120 is closer or further from image device 130 than the crossover point.

In an optional variation on this embodiment, each laser can also be rotated in place about its axis as indicated by arrows 108, thus changing the size of two dimensional geometric FIG. 110. The set of lasers could include any convenient mechanical or electrical linkage to control and coordinate their individual rotations. The effect of such rotation is a variable measurement range in which the invention operates, all other factors being constant.

As compared to other optical measurement systems, one advantage of the invention follows from the crossover point lying within the measurement range of the system. This permits the use of optical equipment having relatively narrow fields of view, which are physically smaller and thus suited for many applications in which equipment size is important (such as in-line industrial sensing, measurement, and other applications of machine vision, particularly in the semiconductor and electronics industries). Yet, despite its relatively narrow beam and field of view, the invention provides relatively high resolution, very accurate distance measurement, and very high repeatability. This can be compared to, for example, so-called scanning Moiré interferometers, which provide accurate measurement but employ light projected at an angle of incidence of approximately 45° to the work surface, i.e., a wide beam as compared to the invention. According to general principles of optics, systems using such high beams are limited to apertures of approximately the same size, which are undesirable. In addition, such systems are subject to undesirable amounts of shadowing effects. Thus, for example, the invention is particularly well suited for measuring the depth of narrow holes.

If desired, and especially if optical signal generators other than lasers are used, illumination sources 104 may be similarly pointed toward target 120. Conventional high-intensity near-infrared (NIR) light emitting diodes (LEDs) may be used for illumination sources 104. The number and arrangement of illumination sources 104 are not limitations on the scope of the invention. High intensity light emitting diodes are also mounted on the printed circuit board in a pattern that favors illumination of the target. Some of these diodes surround the lasers and are adjusted and aimed with the lasers. The lasers and diodes are supplied voltage from off the board through mounted connectors, allowing them to be turned on in banks or one at a time.

Depending on the magnification of the optical system, distance to the crossover point, and the crossover angle, an accurate relationship can be determined between circumference of the triangle and true distance. Further, with careful image processing the exact centerlines of each line projection can be determined, which greatly reduces the effect of laser speckle, biasing and distortion. Additionally, the use of a crossover point in the mid-range of triangle projection increases the sensitivity considerably, while at the same time providing a convenient geometry for alignment and calibration.

Figure 5:
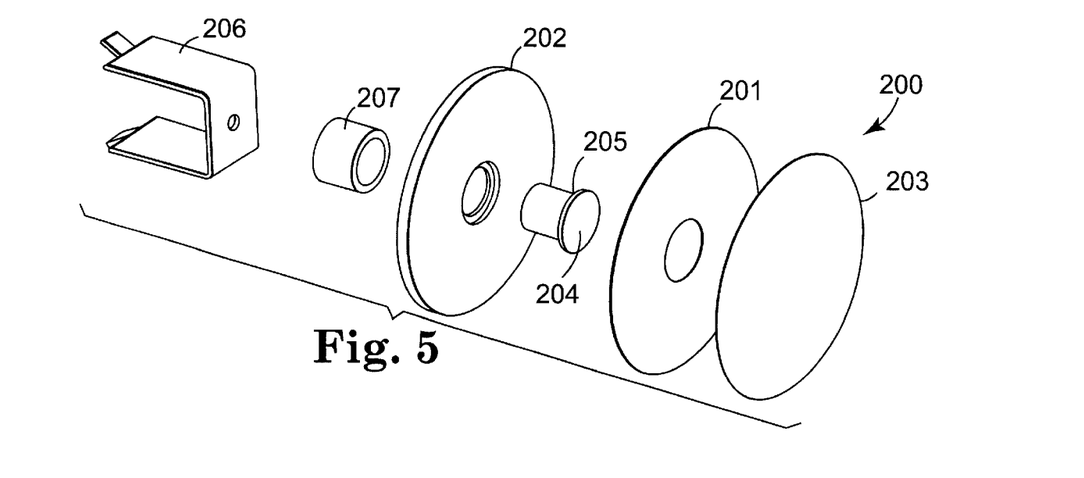
FIG. 5 is a perspective exploded view of a preferred embodiment of a retroreflective target aspect of the invention.

FIG. 5 is a perspective exploded view of a preferred embodiment of another aspect of the invention, a non-opaque reflecting target 200 that may be mounted to object 120 and on which two-dimensional geometric FIG. 110 may be projected. Use of any target is optional, but preferred, to increase range and sensitivity by reflecting a higher percentage of the light back toward the image device 130. In the preferred embodiment shown, target 200 comprises a fine-grained retroreflective material 201 mounted to a base 202 and covered with preferred protective layer 203, which may be attached to retroreflective material 201 with conventional transparent spray adhesive. A center feature 204, which may be any arbitrary shape but is preferred to be a circle to simplify image processing, lies within retroreflective material 201. Alternative configurations for center feature 204 include any polygon, crosshairs, etc. Center feature 204 may be located and used for centering of the field of view of the cameras in accordance with known techniques, however, the invention is robust enough to tolerate off-center tolerances of as much as 0.5 inch without loss of overall system accuracy.

These parts may be assembled in any convenient manner, but it is particularly preferred to provide an appropriately sharp edge 205 on center feature 204 so that it may cut out the center portion of retroreflective material 201 and press fit snugly into the center hole of base 202, thus positioning the surface of center feature 204 flush with the surface of retroreflective material 201. Target 200 may be mounted to the object in any convenient manner, such as by clip 206. Spacer 207 provides stability.

In operation, center feature 204 is kept generally centered in the camera field of view, thus better maintaining symmetry for the laser line and triangle projections. A contrasting feature at the center of the target enables image analyzer 140 to determine the X and Y displacements of the target within the camera field of view. This is aided by the addition of an additional illumination source selected for the camera sensitivity and aimed at the target. By placing the light source near the camera optical path (thus providing on-axis illumination), the retroreflective target also serves to direct light into the camera and enhancing the contrast of the target feature. The geometric center or outline of the feature is used to determine the target X and Y displacement relative to the camera field of view. A true measurement of X and Y offset from the optical center line can be calculated after calibrating the relationship between the magnification and the distance, and by using the distance to the target determined by the laser measurement (or some other means). Also, the size of the image of center feature 204 provides an approximate measure of distance D.

Figure 7:
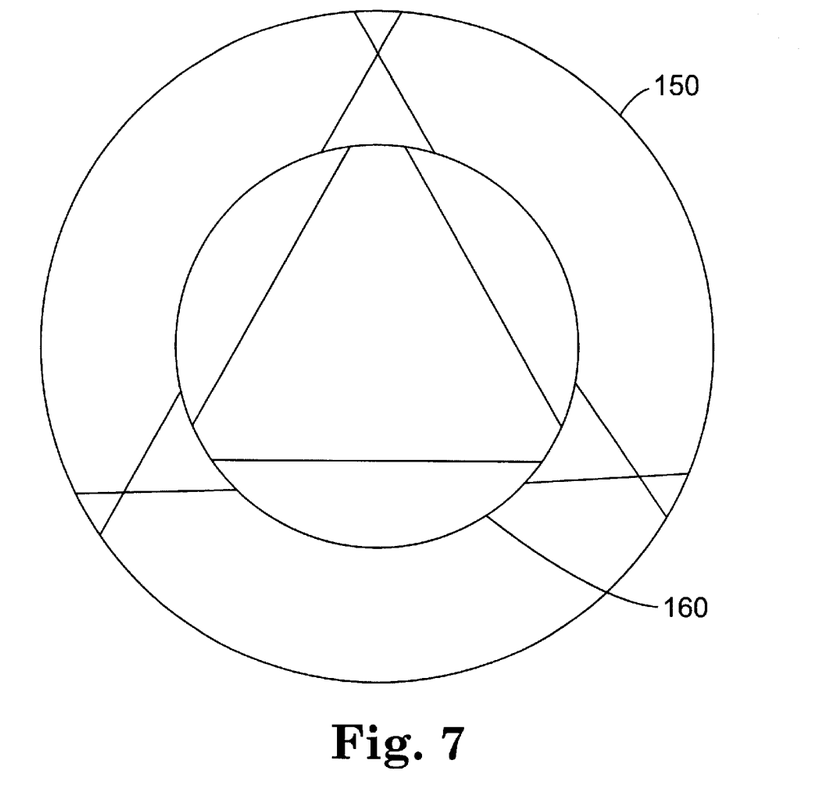
FIG. 7 and 8 are a schematic view of an image produced by alternative embodiments of the invention.

In yet another embodiment, multiple targets are used so that a single image processed by image device 130 and image analyzer 140 may contain multiple portions, each of which is analyzed to determine respective distances to each target. An example of the image produced by one possible arrangement is shown in FIG. 7. Annular target 150 surrounds optical path 102 (perpendicular to the plane of FIG. 7) and circular target 160 is centered on optical path 102.

For example, the target has a hole cut in the middle through which a second target can be viewed. A contrasting (preferably black) ring is inset at the outside edge of the first target. The second target has a similarly contrasting (preferably black) circle in the center. This configuration allows the differential measurement of the two targets in X, Y, and Z directions. If both targets are attached to the same object, both the position and rotation of the object can be determined and tracked.

Figure 8:
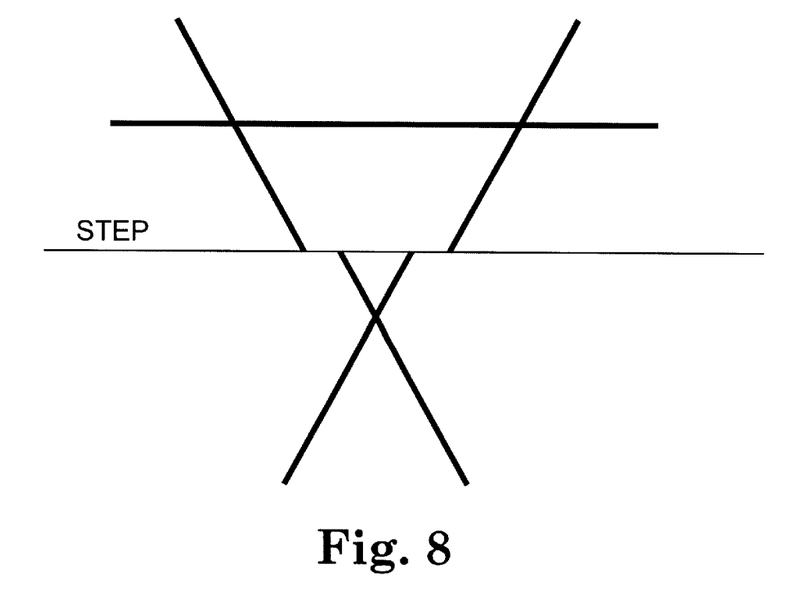

A similar "split" image, as indicated by FIG. 8, would result if the invention were used to measure step height (or depth, as the case may be) by determining the distance to each of multiple portions of the image, then finding the difference between the two distances.

In any embodiment of the invention, a computer controller may control the lasers and lights, and also capture and analyze images using an off-the-shelf frame grabber board. Suitable equipment includes a commercially available CCIR format camera, Leutron black and white frame grabber board, and a PC compatible computer with a 333 MHz AMD K6 processor.

When making a distance measurement, the lasers are turned on together or one at a time. Together, the lasers project an equilateral triangle in the preferred embodiment. The size of this triangle depends on the distance D. Normally, the lasers are aimed so that when the target is at the crossover point, all of the lines intersect symmetrically in a point. The triangle "inverts" on either side of this point, i.e., the direction in which any given apex of the triangle points will reverse on itself as the object moves through the crossover point. The camera captures an image of the laser projections. Line detection and regression or any of a variety of pattern recognition algorithms can be used to determine the geometry and polarity of the equilateral triangle. In one preferred implementation, lines may be analyzed individually by capturing images with each laser individually turned on. Binary conversion of the resulting 8-bit deep grayscale images may be accomplished by setting a threshold point determined by histogram analysis of each image. Pixels having intensities above a threshold level are considered to be data points on the laser line. Linear regression may be performed on each line data set to determine slope and intercept; alternatively, any known form of similar data analysis may be used, such as polynomial or logarithmic regressions. The intersections of line pairs may then be used to determine the corners of the triangle and in turn to calculate the circumference. A simple test for polarity of the triangle checks the position of one crossover point against the position of the opposing leg of the triangle. The circumference value may then be used to compute distance as a function of magnification, laser pitch angle, and crossover distance. Alternately a calibrated lookup table may be used.

In another embodiment, the image may be captured with all three lines present. After binary conversion, the lines may be separated by rotation, followed by histogrammed projection onto an orthogonal axis. High pixel counts in the resulting histogram indicate the location of a line. Masks may be calculated for each line, which allows them to be separated from the general image. After line separation, the triangle may be analyzed as described above, and distance determined.

EXAMPLE

An embodiment of the invention was constructed for use in an automated chassis measurement system of they type generally disclosed in the pending U.S. patent application of Robert E. Olson et al. entitled, "Robotic Vision and Measuring System." The embodiment of the invention generally corresponded to the embodiment of FIGS. 2–5, and was intended to permit measurement of multiple (e.g., 24) points on the chassis of a vehicle suspended approximately 24 inches above the arm of the system, and in which the points lay within a vehicle envelope of 72 inch (width) by 216 inch (length) by 24 inch (height), exclusive of interference zones and area outside of a 3 foot radius at either end of the length of the envelope. In these circumstances, absolute measurement accuracy (in three dimensions) of better than ±3 millimeter was required; this implied a repeatability for any individual measurement of better than ±0.6 millimeter.

The rotatable arm (FIG. 4) was approximately 42 inch in length, and housed at its rotational end the measurement head (FIGS. 2 and 3) beneath a clear glass protective cover. The central assembly of the arm was itself movable in a lateral direction, underneath the chassis, using a robot crawler and track system that are not required for practice of the invention.

The measurement head comprised three laser line generators arranged at 120 degree angles with respect to each other. Each generator was a class IIIa visible red (670 nanometer wavelength) laser operating at less than 2 mW output. Each was focused in the range of 6–30 inches, and had a line width at half power of less than 1 millimeter and a projection line angle greater than 10 degrees. They were arranged to provide resolution in each of the X, Y, and Z directions of 0.010 inch, within a range of 2–84 inches, as measured from the protective cover over the measurement head. The field of view was 1.5 inch at the minimum working distance, 2.0 inch at 36 inch distance, and 4.0 inch at 84 inch distance.

Two banks of twelve high intensity LEDs, each having a dispersion angle of 8–10 degrees and wavelength of 670 nanometers (red), provided supplemental illumination of the target by the measurement head. The intensity variance was less than 50% in the field of view, and less than a ratio of 3:1 across the worlding range.

The image device was a ⅓ inch CCD camera operating in CCIR (black and white) mode. It had 540 lines of horizontal resolution and at least 500 lines of vertical resolution, using a ¹⁄₁₀,₀₀₀ second electronic shutter. The camera lens had a focal length of 50 millimeter.

The target (FIG. 5), was 2 inch in diameter. The retroreflective material provided a light reflection cone of 20 degrees in size, and the target could be measured within a viewing angle of up to 45 degrees. The target was precision manufactured to provided an offset error in X, Y, or Z direction (relative to a datum point) of ±0.25 millimeter.

Unless specifically indicated otherwise, all references to analog components should be understood to include digital components (or to be equivalent to them, as the context may dictate), and vice versa. All references to circuit components (with or without ancillary items) should be understood as including (or as equivalent to) any hardware- and/or software-based implementation, including programmed microcontrollers, programmed microprocessors, logic gates, programmable logic controllers, custom state machines, and other customizable circuit elements.

The invention has been described without specific reference to optical elements such as mirrors, lenses, etc. that could be incorporated into the various embodiments of the invention without changing the basic operating principles involved. Similarly, it is well within the skill of the art to modify factors such as magnification, orientation, and the like that would be introduced by such elements. Therefore, it should be understood that embodiments having such optical elements are either within the literal scope of the invention as claimed below, or equivalent to systems and methods defined by such claims, as the case may be. Similarly, while the preferred embodiment uses light having a frequency lying in the visible range, it should be understood that this is not required and that modifications to any aspect of the system that may be required to operate outside the visible range are within the skill of the art, within the scope of the claims, and/or equivalent to the invention, as the case may be.

All numerical values associated with the preferred embodiment illustrated in the Figures are parameters that may take on different values depending on the specific embodiment of the invention that is implemented in practice. All such parameters may therefore be adjustable, either by the user or automatically by the system (e.g., by software within the system).

I claim:

1. A system for measuring distance to a target along a Z axis within a measurement range, comprising:

at least one optical signal generator, aimed to project onto the target a signal in the form of a two-dimensional outline of a shape;

an image device aimed to capture a reflected image of the two-dimensional outline of the shape; and an image analyzer, connected to the image device, configured to compute distance to the target from a geometric parameter of the reflected image.

2. A system for measuring location of a target in at least one dimension within a measurement range, comprising:

at least one optical sign generator, aimed to project onto the target a signal in the form of a two-dimensional outline of a shape;

a contrasting feature on the target;

an image device aimed to capture a reflected image of the two-dimensional outline of the shape; and an image analyzer, connected to the image device, configured to
        compute, from a geometric parameter of the reflected image, the distance to the target along a Z axis;
        locate a point within the contrasting feature relative to a field of view of the image device;
        use the result of ii) to compute, as a function of the distance computed in i), location of the target in at least one dimension.

3. A method for measuring distance to a target along a Z axis within a measurement range, comprising:

projecting onto the target a two-dimensional outline of a shape;

capturing a reflected image of the two-dimensional outline of the shape; and computing distance to the target from a geometric parameter of the reflected image.

4. A method for measuring location of a target in three dimensions within a measurement range, comprising:

projecting onto the target an outline of a shape;

capturing an image of the outline of the shape;

capturing an image of a contrasting feature on the target;

computing, from a geometric parameter of the reflected image, distance to the target along a Z axis;

locating a point within the contrasting feature relative to a field of view; and using the result of e) to compute, as a function of the distance computed in d), location of the target in X and Y directions.

5. The system of claim 1 or 2, in which the geometric parameter is the perimeter of the geometric figure.

6. The system of claim 1 or 2, in which the two-dimensional geometric figure is symmetric.

7. The system of claim 1 or 2, in which the two-dimensional geometric figure is a polygon.

8. The system of claim 1 or 2, in which the two-dimensional geometric figure is a triangle.

9. The system of claim 1 or 2, in which the image device is an electronic camera.

10. The system of claim 1 or 2, in which the image analyzer determines the distance to the target using at least one of: a calibrated magnification of the system and the two-dimensional geometric parameter; a calibrated lookup table; and a mathematical equation.

11. The system of claim 1 or 2, in which the optical signal generators rotate to change dimensions of the two-dimensional geometric figure.

12. The system of claim 1 or 2, in which the optical signal generators are laser line generators.

13. A target for determining location within a measurement range, comprising: a base having a flat retroreflective surface region; a flat contrasting inset region located within, and flush with, the flat retroreflective surface; and a transparent protective cover over the retroreflective and contrasting regions.

14. The combination of the system of claim 1 or claim 2 and the target of claim 13.

15. A method for measuring distance to a target along a Z axis within a measurement range, comprising:
   a) projecting onto the target a two-dimensional geometric figure;
   b) capturing a reflected image of the two-dimensional geometric figure; and
   c) computing distance to the target from a geometric parameter of the reflected image.

16. A method for measuring location of a target in three dimensions within a measurement range, comprising:
   a) projecting onto the target a geometric figure;
   b) capturing an image of the geometric figure;
   c) capturing an image of a contrasting feature on the target;
   d) computing, from a geometric parameter of the reflected image, distance to the target along a Z axis;
   e) locating a point within the contrasting feature relative to a field of view; and
   f) using the result of e) to compute, as a function of the distance computed in d), location of the target in X and Y directions.

17. The method of claim 16, further comprising illuminating the contrasting feature on the target and capturing a reflected image of the contrasting feature.

18. The method of claim 16, in which the point is the geometric center of the contrasting feature.

19. The method of claim 15 or 16, further comprising providing at least one optical element through which the projecting or capturing occur(s).

20. The method of claim 15 or 16, further comprising aiming an image device along the Z axis to capture the reflected image.

21. The method of claim 15 or 16, in which the geometric parameter is the perimeter of the geometric figure.

22. The method of claim 15 or 16, in which the two-dimensional geometric figure is symmetric.

23. The method of claim 15 or 16, in which the two-dimensional geometric figure is a polygon.

24. The method of claim 15 or 16, in which the geometric figure is a triangle.

25. The method of claim 15 or 16, further comprising determining the distance to the target using at least one of: a calibrated magnification of the system and the two-dimensional geometric parameter; a calibrated lookup table; and a mathematical equation.

26. The method of claim 15 or 16, further comprising rotating the optical signal generators to change dimensions of the two-dimensional geometric figure.

* * * * *